Oct. 7, 1947.   L. C. MILLER ET AL   2,428,674
APPARATUS FOR CONSTRUCTING AIRCRAFT WINGS
Filed May 17, 1943   5 Sheets-Sheet 3

L. C. Miller
G. E. Scarlett
INVENTOR.

BY Edwin C. McRae
R. G. Harris
Attorneys.

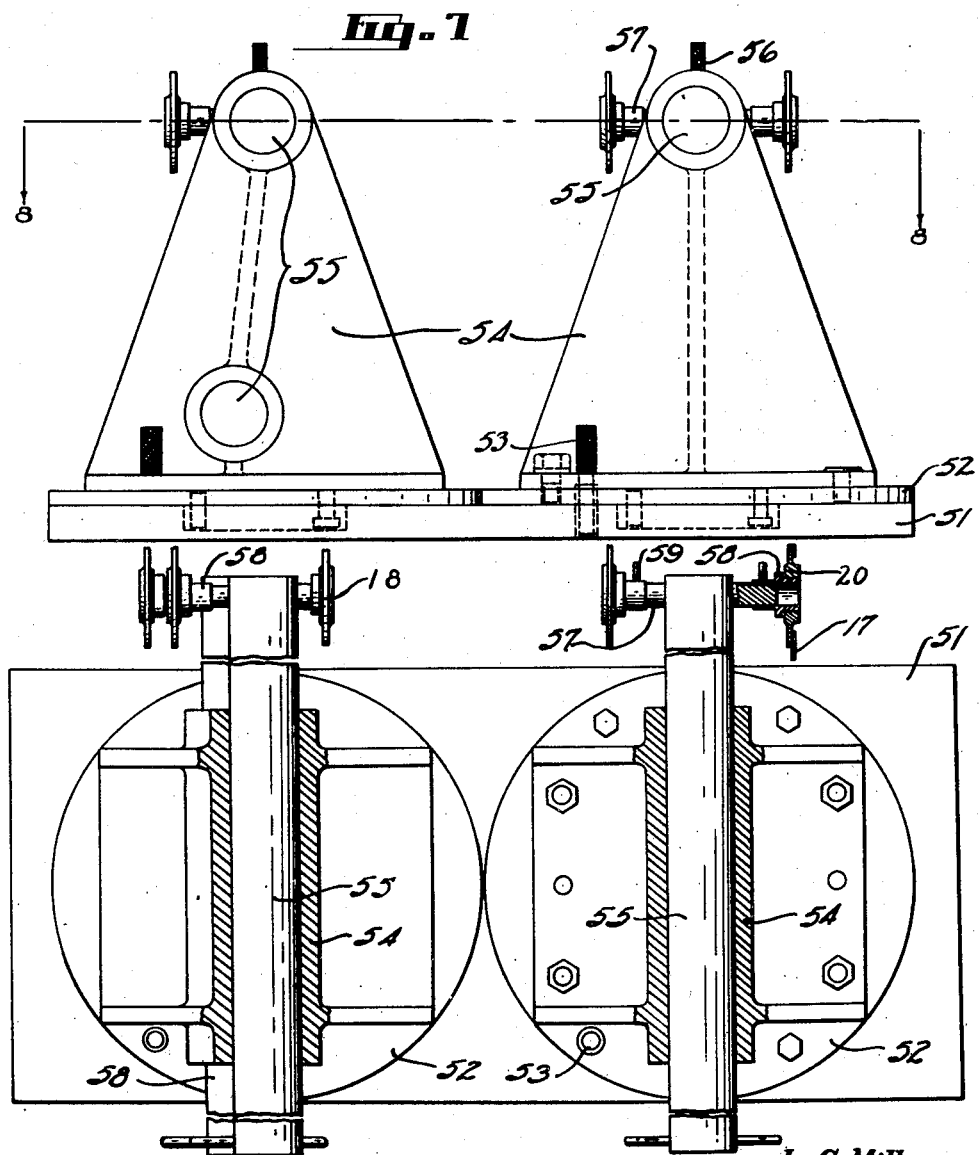

L. C. Miller
G. E. Scarlett
INVENTOR.

Patented Oct. 7, 1947

2,428,674

UNITED STATES PATENT OFFICE 2,428,674

APPARATUS FOR CONSTRUCTING AIRCRAFT WINGS

Logan C. Miller, Ann Arbor, and George E. Scarlett, Detroit, Mich., assignors to Ford Motor Company, Dearborn, Mich., a corporation of Delaware Application May 17, 1943, Serial No. 487,279

5 Claims. (Cl. 29—286)

This invention relates to the construction of airframe components and more particularly to apparatus for constructing wing members of aircraft.

An advantage of this invention is that it provides an apparatus by means of which aircraft wings can be produced on a quantity scale and with perfect interchangeability. Another advantage is that the structure of the wing is initially simplified and reduced to major components which can be readily assembled in accessible position and then joined together to form the finished wing structure with a minimum of operation in the restricted working areas which otherwise result. Another advantage is that the interchangeability of components is maintained throughout, and the apparatus used is designed to take full advantage of and maintain this uniformity. Another advantage is that by the described selection of locating means, the structure in the course of construction is equated to the completed structure in so far as points of application of forces are concerned so that undue stress or the likelihood of failure or distortion is materially reduced.

In essence, this invention comprehends the distribution of an aircraft wing structure into several principal components, the separate fabrication of these components and the assembly of these components under proper control to form a completed structure. In some respects it is analogous to copending application Serial No. 463,267, filed October 24, 1942, for Airframe assembly and method thereof, now matured into United States Patent No. 2,378,043, issued June 12, 1945. That invention while principally concerned with the fabrication of the aircraft wings is more particularly concerned with the method of skin assembly and attachment, while the present invention deals with the internal construction of the wing and the structures used to effect this. However, the final assembly fixture necessarily is an element in both since it is there that the internal elements and skin are brought together and secured in the final form, and this fixture is specifically claimed in this application.

With these and other objects in view, the invention consists in the arrangement, construction and combination of the various parts of the improved device, described in the specification, claimed in the claims and illustrated in the accompanying drawings in which:

Figure 7 is a rear elevation of the locating turrets used.

Figure 8 is a plan view of the same turrets with parts in section and with other parts broken away.

Figure 1:
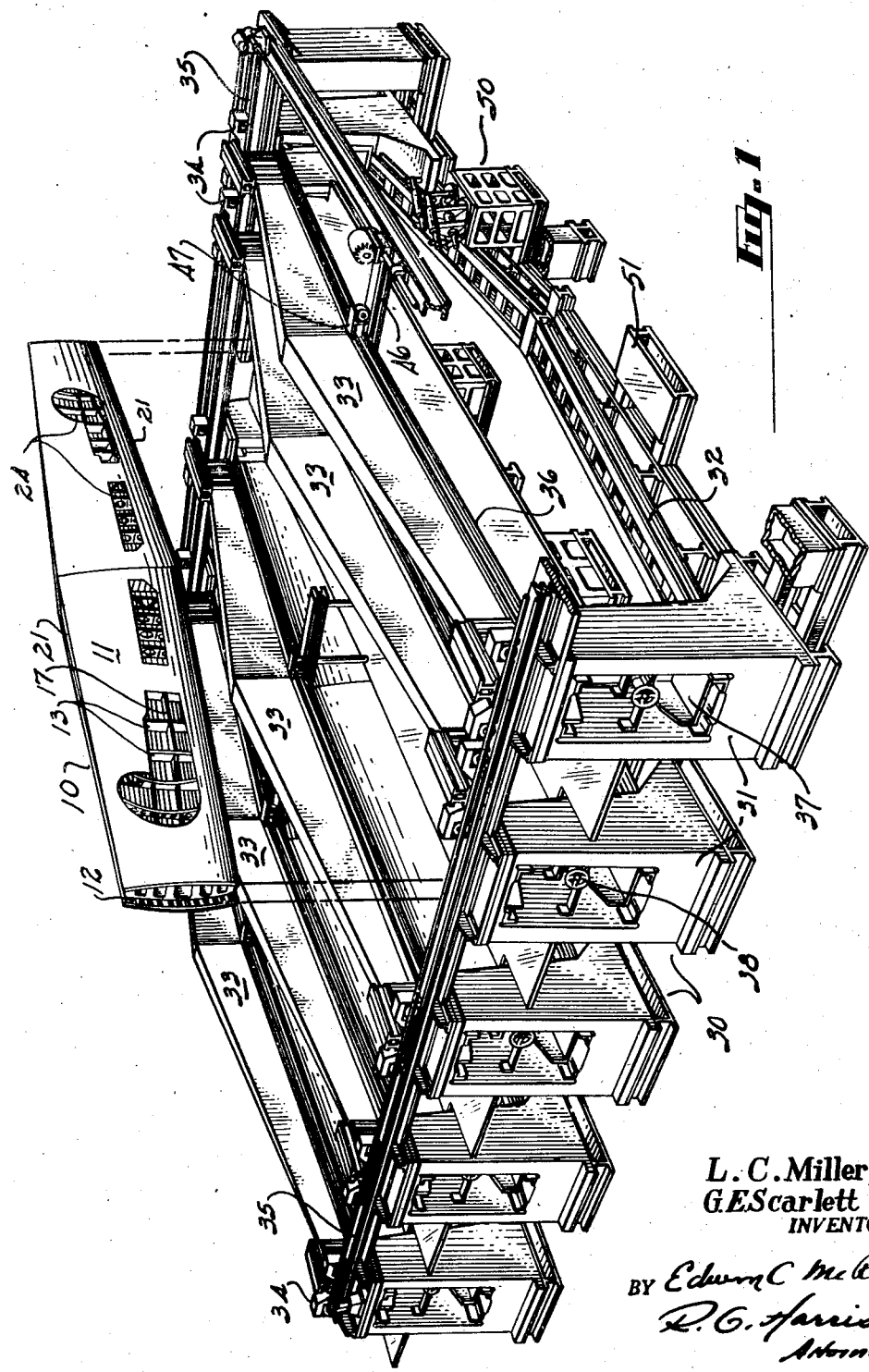
Figure 1 is a perspective view of a bank of final assembly fixtures constructed according to this invention with parts broken away.

Referring to Figure 1, 10 indicates an aircraft wing section (the lower surface being shown) which comprises a skin 11 attached to stringers 12 which in turn are supported by a number of transverse bulkheads 13 enclosed by front and rear spars 21 and reinforced by intermediate spars or webs 17. Openings 24 are provided to receive the landing wheels in their retracted position and for subsequent installation or service of fuel tanks. This construction is commonly used in the art and is without novelty.

Figure 9:
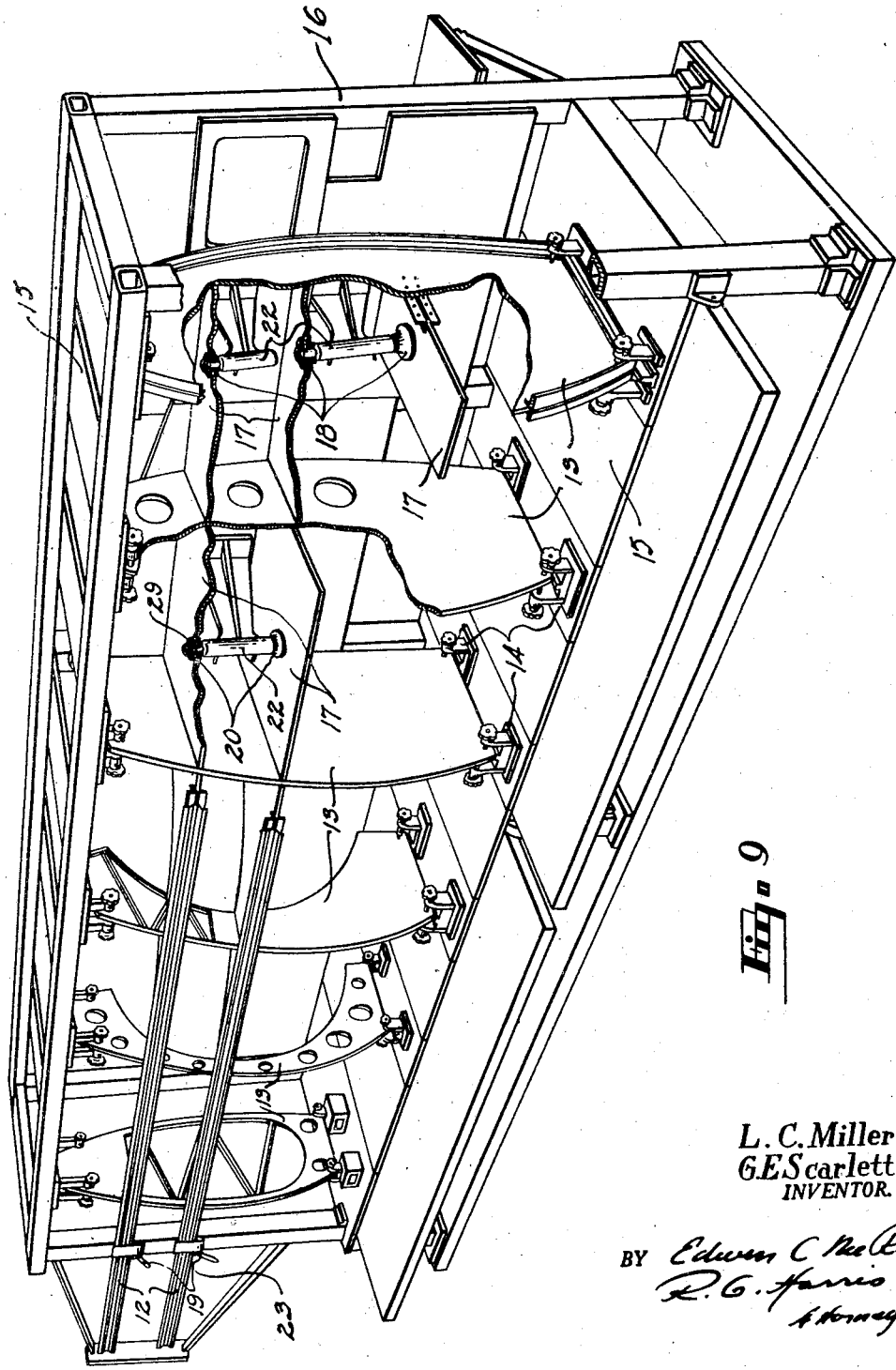
Figure 9 is a perspective view of the fixture in which the preliminary bulkhead assembly is fabricated with parts broken away.

An example of the principal structural subassembly of the wing is shown in Figure 9 in which the bulkhead subassembly 23 is prefabricated. This comprises a number of transverse bulkheads 13 which are supported by means of a number of clamp supports 14 located on the top and bottom panels 15 of the bulkhead assembly fixture 16 in the proper spacing and alignment so as to be in precisely the same relative position that they will occupy in the wing. Secured to both surfaces of the bulkheads (although indicated on the upper surface only to avoid confusion) are several of the stringers 12 which run longitudinally of the wing and to which the skin is eventually attached. These are releasably secured in the fixture by the clamps 19 and then permanently to the bulkheads; and being positioned on each side of them, they together form a subcomponent which is rigid enough to maintain its position during transportation to final assembly. The differentiating element in this setup is the use of an internal structure such as the landing gear bushings as the principal locating points throughout the preassembly and final assembly steps.

In the particular craft under consideration, the landing gear is retractable in the wing and hingedly mounted on it. It will be understood that the forces imposed upon the wing structure during landing are of very high magnitude and as a consequence the wing is particularly designed to have the necessary strength to counter the stresses resulting. It is also a requisite that the wing have the necessary rigidity so that when the plane is in flight and the wing is deformed by the stresses imposed on it, the bearing points will not be stressed out of relative alignment in which case the landing gear would quite probably jam or become otherwise inoperative. The invention, therefore, contemplates using these landing gear attachment points since they are designed to transmit the maximum forces and since their absolute alignment in the final craft is essential to successful operation of the landing gear. These attaching points include one group of three bushings 18 arranged linearly inboard of the wing and a second pair 20 outboard thereof, both groups being supported on webs 17. Accordingly, in the setup of Figure 9, the webs 17 which have riveted thereto the bushing forgings 18 or 20 are positioned on the three supports 22 rigidly attached to the bulkhead assembly fixture 16 in corresponding alignment to the landing gear trunnions in the completed wing. The webs, so supported and aligned, are then riveted to the appropriate bulkheads and stringers to complete the bulkhead subassembly 23. As will be noted in Figure 9, this includes the bulkheads through the area, certain of the stringers both top and bottom and the webs with their attached bushing forgings all in the precise relationship required for the wing assembly. The supports 22 have retractable pins 29 which slidably engage the bores of the bushings while the faces of the bushings rest directly on the supports.

The clamps 14 and 19 are then released and the subassembly 23 is removed from the bulkhead assembly fixture 16 and transported to the final assembly fixtures 30. As shown in Figure 1, these are preferably arranged in a bank of similar structures and each comprises end columns joined by a bed 32 which conforms in shape and alignment to the forward spar of the wing section desired. In addition, each has a movable bridge 33, mounted on end trucks 34 rolling on the tracks 35 extending between adjacent end columns 31, and having a lower face 36 conforming in shape and alignment to the trailing spar of the wing to be built therein. A middle support 46 on which runs the carriage 47 secured to the bridge 33 is provided to reduce deflection. Each of the end columns 31 has a transversely movable head 37 equipped with means 38 to move it inwardly or outwardly with respect to the fixture bed 32.

In assembly, the leading edge spar 21, which is built up from extruded channels or angles 26 and a plate 27, the flanges 28 of the channels or angles being oblique to the plate and conforming to the upper or lower curvature of the wing surface, is laid on blocks 39 (see Figure 6) secured to the bed 32 of the fixture by clamps 60 whose structure is described in detail below and bolted at its ends to the abutting heads 37.

Figure 4:
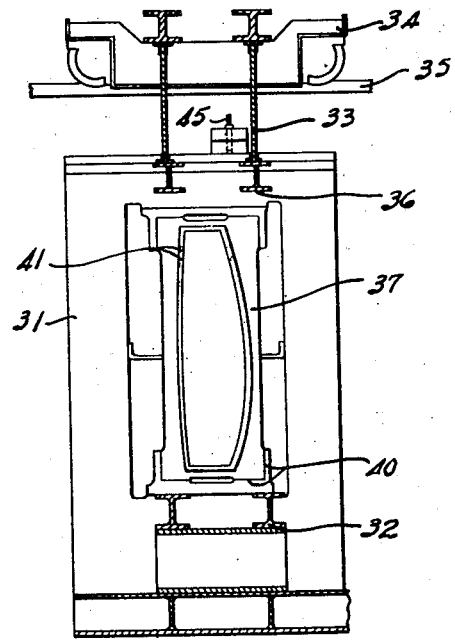
Figure 4 is an end view of the fixture taken from the inner side thereof and Figure 5 is a similar view taken from the outer side.
Figure 5:
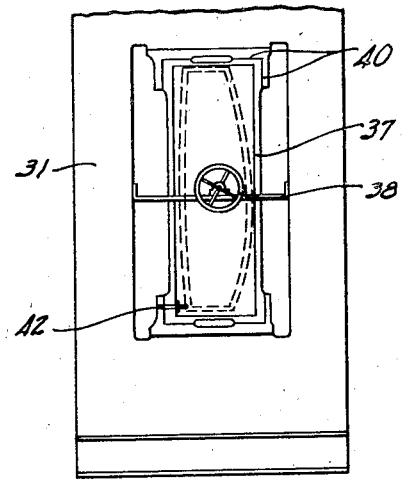

Referring to Figures 4 and 5, the slidable head 37 is shown mounted in ways 40 and equipped with a screw drive means 38 by which it can be advanced or withdrawn from engaging position. The head is equipped with a locating plug 42 (shown in Figure 5) which can be engaged with a suitable hole in the ways 40 when the head is at the desired position. This establishes a working surface defining the ends of the wing in predetermined alignment and holds the over-all wing dimension within narrow limits.

The bulkhead subassembly 23 is then placed in approximate position on the leading edge spar 21. Precise location is obtained when the bushings 18 and 20 are engaged by the turret locators 50 (shown in detail in Figures 7 and 8) which are mounted on a permanent base 51 adjacent each assembly fixture. These include a rotatable table 52 mounted on the base and indexed by means of a removable locator plug 53 to a predetermined radial position with respect to the fixture. Mounted on the table 52 are the bearing structures 54 which slidably receive the shafts 55, provision being made through the locator pin 56 to control to predetermined position the longitudinal extent of the shafts. At the inner end of each shaft is a crossbar 57, and slidably mounted adjacent the ends of the latter are the bushing locators 58 whose position relative to the crossbar 57 is controlled by locator plug 59.

Figure 2:
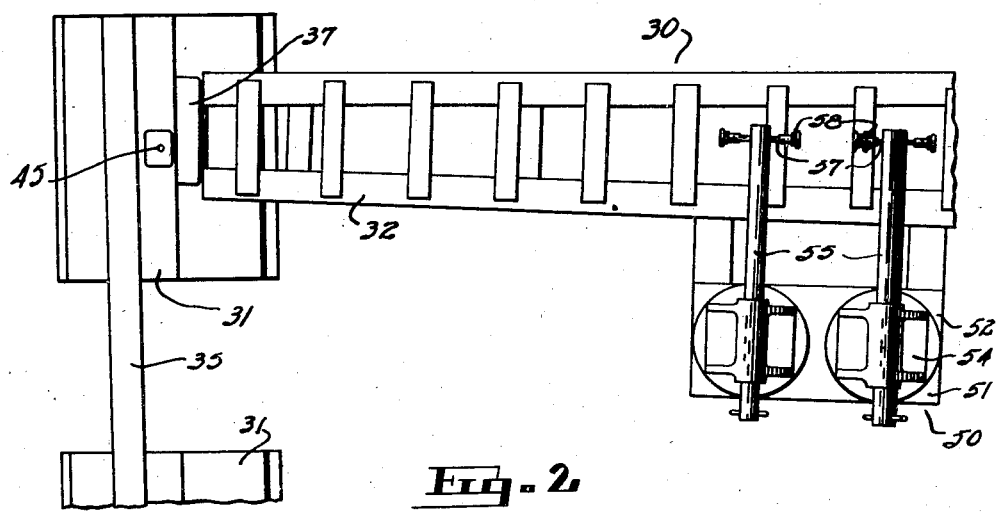
Figure 2 is a plan view of a portion of one of these fixtures, the bridge being displaced to show the bed construction.

Thus, with the bulkhead subassembly in approximate position on the leading edge spar, the table 52 (which has previously been swung to one side to obtain clearance) may be rotated to the position indicated in Figure 2 and secured by locator plug 53; and the shafts 55 advanced to the position governed by pins 56. The bushing locators 58 are moved inwardly on the crossbars 57, which are rotated into alignment with the bushings of the subassembly. The bushing locators 58 are then moved outwardly to the position determined by the locator plugs 59 and engage the bushings 18 or 20 in the subassembly accordingly. It will be seen that since the turret and the various locating means have been fixed in a predetermined location corresponding to the ultimate construction of the ship, the bulkhead subassembly is now located in precisely the position desired with reference to the remainder of the fixture and the spars and bulkheads secured therein. The trailing edge spar is then placed over the top of the bulkhead subassembly; the movable bridge 33 is then moved into alignment with the bed 32 as determined by the plug 45 and the spar is securely clamped to it and bolted to the head 37.

Figure 3:
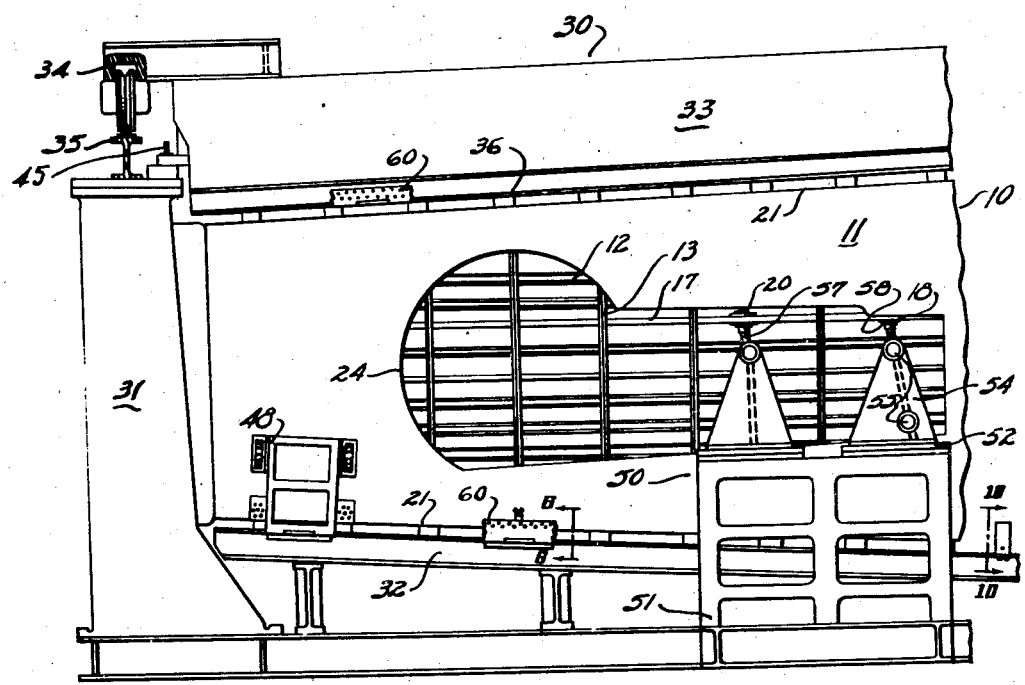
Figure 3 is an elevation of the fixture corresponding to a portion shown in Figure 2 and showing a wing assembly therein with parts in section.

The remaining bulkheads making up the wing assembly may then be slipped in place between the spars and riveted to the respective spar members in predetermined location. It will be apparent from Figure 6 that the spars serve as locating means for the placement of these bulkheads since they are secured in position transversely of the bed 32 by clamp 60 and longitudinally by attachment to the heads 37. After the bulkheads have been riveted to the spars, the skin with the stringers attached, as described in the application previously identified, is placed over the framework and the ends of the stringers are bolted to the heads 37 through holes 41. The skin is then secured to the flanges 28 of the spars by riveting, the clamp 60 incorporating, for this purpose, bushed drilling holes 61 corresponding in placement to the rivet pattern desired in this area. To place the skin, the spar hold-down arm 68 is released by the bolt 69 and swung back; the skin hold-down arm 63 is loosened by the bolt 62; the skin inserted, and bolt 62 retightened securing the skin against the flange 28. The operator may then drill through the bushed holes 61 to form complementary rivet holes in skin and flange. The bolt 62 is then loosened and the skin hold-down arm 63 swung back; the rivet holes reamed and countersunk, and rivets inserted therein and driven. As described in the earlier application, bolts are placed between the stringers attached to the skin and the bulkheads to complete the wing assembly. It will be understood that the skin hold-down 63 is provided in continuous sections along both sides of the bed and bridge (only a portion being indicated in Figure 3) but that the spar hold-down arms 68 are provided only at spaced intervals as required. The clamp may be further elaborated as shown in Figure 3 in which templates 48 for drilling the motor mount attachment are incorporated with it.

Figures 6, 10:
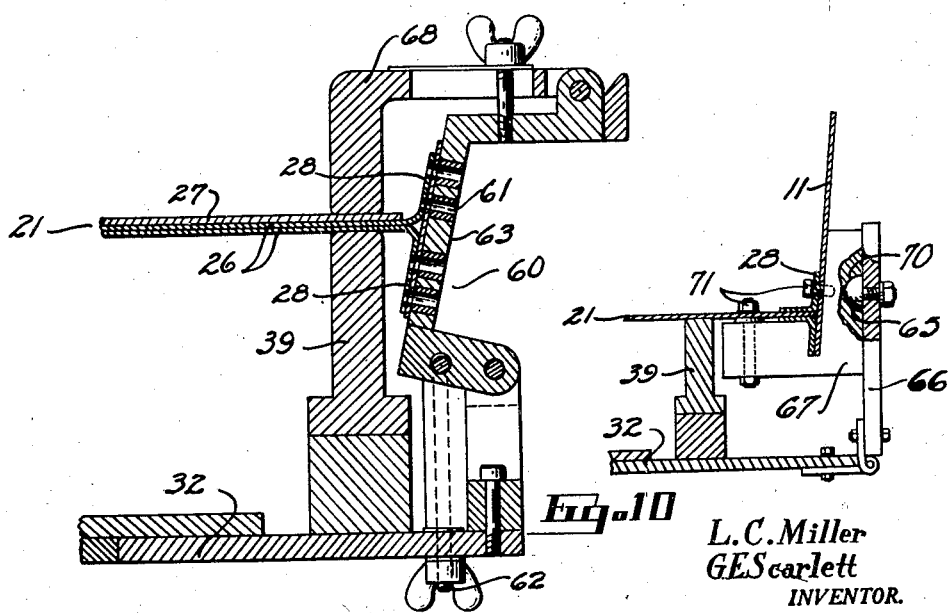
Figure 6 is a section on an enlarged scale taken on the line 6—6 of Figure 3.
Figure 10 is a section on an enlarged scale taken on the line 10—10 of Figure 3.

Secured to the bed 32 and spaced a short distance either side of its center line are the hinged arms 66 which have ball locators 65 permanently secured at their outer ends (Figure 10). These may be rotated upwardly contacting locating blocks 67, which have complementary cavities 70, which are thus located and then secured by bolts 71 on the lower surface of the wing immediately adjacent the front edge. The function of these locators is more fully described in copending application Serial No. 463,268 for Mating fixture in which the method of locating the wing with subsequent assemblies is set forth. Similar arms are provided on the movable bridge 33 and similar locating blocks are applied by them to the lower surface of the wing immediately adjacent the rear edge.

It will thus be noted that starting from the bulkhead subassembly which is secured on the locating turrets which are fixed with respect to the remainder of the fixture, the assembly of the remaining components of the wing is carried out according to fixed means whose position is at all times interrelated. Thus, the bulkhead subassembly is fixedly secured with respect to the fixture; the fixture includes means to fixedly secure the wing spars and the ends of the stringers; the spars themselves then determine the position of the intermediate bulkheads which are then secured with respect to the spar and the initial bulkhead assembly, and the final element—the skin—is itself positioned with respect to the previously set spars and bulkheads as well as directly to the fixture through the attachment of the stringers to the end plates. It necessarily follows that successive assemblies made from identical parts are necessarily of identical conformation throughout and a truly interchangeable structure is obtained.

These steps being concluded, the turret locators are removed from engagement with the bushings and withdrawn and swung out of position, their location then conforming to that shown in Figure 1. The locating plugs are then removed from the movable bridge which is then detached from the assembly and rolled to clear position, as shown in the second section in Figure 1. The plugs are also removed from the heads which are then detached from the assembly and moved outwardly. The completed wing structure is then free and is lifted out by a crane or otherwise and routed to other stations for the application of further accessories and the completion of its various subordinate parts. The procedure may then be immediately repeated in toto and another wing put in work.

The advantages which result from this form of construction which literally progresses from the inside of the structure outwardly are believed to be manifest. The concept of using an assembly method in which all components are rigidly fixed and secured with respect to successively added components makes possible a completely integrated and interexchangeable unit. The particular advantage is that by utilizing internal portions of the structure upon which the principal stresses are applied in actual service, for example, the ends of the wing (to which the outer wing tips are attached) and the landing gear bushing (which must resist the landing stress imposed) as the principal locating points, insure the formation of a structure in which these highly important areas are precisely situated. Then, by tying these initial locating points in with successively added components, the entire structure may be built to an exactitude which heretofore has not been practicable when external-locating means have been used. At the same time, the stresses normally incident to the construction of these components is avoided since at all times, the emphasis is placed upon supporting the component in a position analogous to that in which it is to be stressed rather than in relying upon incidental strength of the component for this function.

Some changes may be made in the arrangement, construction and combination of the various parts of the improved construction without departing from the spirit of the invention and it is the intention to cover by the claims such changes as may reasonably be included within the scope thereof:

The invention claimed is:

1. An apparatus for the fabrication of aircraft wing components which include exterior skin panels secured to internally disposed longitudinal and transverse members comprising a skeleton and longitudinal edge bounding spar members, which comprises, a fixed bed means conforming in disposition and shape to one edge of said wing, withdrawable control surfaces at the ends of said bed conforming to the end surfaces of said wing, movable positioning means located along said bed and adapted to engage said internally disposed skeleton and support the same in predetermined position with respect to said bed but independently thereof, a movable top member having a lower working face conforming in shape to the other edge of said wing, means on said working face of said top member and on said bed to secure said respective spars in predetermined position thereon, means on said withdrawable control surfaces to engage the ends of said spars, and means to withdraw said top member from registry with said bed to permit removal of a completed wing component from said apparatus, columns at the ends of said beds, said withdrawable control surfaces slidably mounted in said columns for movement longitudinally of said bed, a track supported on the top of said columns, a wheeled carriage on said track, said top member mounted on said carriage for movement transversely of said bed.

2. An apparatus for the fabrication of aircraft wing components which include exterior skin panels secured to internally disposed longitudinal and transverse members comprising a skeleton and having longitudinal spar members adjacent the edges thereof, which comprises, a fixed bed means conforming in disposition and shape to one edge of said wing, transversely withdrawable positioning means located along said bed and adapted to engage said internally disposed skeleton in predetermined relation therewith and support the same independently of said bed, a movable top member having a lower working face conforming in shape to the other edge of said wing, means on said working face and said bed to locate and support said respective spars in position thereon, clamping means hinged along each side of said bed and of said top member to engage said skin with said spar, and means to withdraw transversely said top member from registry with said bed to permit removal of completed wing components from said apparatus.

3. The structure of claim 2 which is further characterized in that said clamping means include means to position said spars with respect to said bed and movable top member prior to the application of said skin thereto and template means to force said skin against said spars after application of said skin thereto, said spar positioning means being hingedly mounted on said last-named means and swingable outwardly thereof to permit installation of said skin.

4. An apparatus for the fabrication of aircraft wing components which include an exterior skin structure secured to an internal skeleton structure, which comprises, a fixed bed means conforming in disposition and shape to one edge of said wing, end control surfaces mounted at the end of said bed and movable longitudinally outwardly thereof from predetermined inner positions, a transversely movable top member having a lower working face conforming in shape to the other edge of said wing, means to position said top member and said end members in registry with said bed to outline said wing component therebetween, positioning means located along said bed to engage said internal skeleton structure and position said structure independently with respect to said bed, and means to withdraw said top member transversely from registry with said bed and said end members longitudinally of said bed to permit removal of completed wing components from said apparatus.

5. The structure of claim 4 which is further characterized in that said positioning means comprises, a horizontally rotatable turret, horizontal locating means slidably mounted in said turret means, and engaging means adapted to engage said skeleton oblique to and slidably mounted on said locating means.

LOGAN C. MILLER.
GEO. E. SCARLETT.

REFERENCES CITED

The following references are of record in the file of this patent:

UNITED STATES PATENTS

| Number | Name | Date |
|---|---|---|
| 2,378,043 | Sorensen et al. | June 12, 1945 |
| 2,342,025 | Watter | Feb. 15, 1944 |
| 602,844 | Felsche | Apr. 26, 1898 |
| 379,321 | Moyer | Mar. 13, 1888 |
| 414,770 | Hanika | Nov. 12, 1889 |
| 1,615,335 | Macomber | Jan. 25, 1943 |
| 2,328,040 | Weightman | Aug. 31, 1943 |
| 1,271,386 | Tarbox | July 2, 1918 |
| 1,303,596 | Riffard | May 13, 1919 |
| 1,307,144 | Patrick | June 17, 1919 |
| 2,304,493 | Bullock | Dec. 8, 1942 |
| 1,822,270 | Bunch | Sept. 8, 1931 |
| 1,700,391 | Williams et al. | Jan. 29, 1929 |
| 1,559,807 | Thaden | Nov. 3, 1925 |
| 2,087,626 | Minshall | July 20, 1937 |
| 2,301,636 | Nicol | Nov. 10, 1942 |
| 2,314,319 | Smith | Mar. 16, 1943 |